US010621069B2

(12) United States Patent
Tokie

(10) Patent No.: US 10,621,069 B2
(45) Date of Patent: Apr. 14, 2020

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Katsuji Tokie, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/610,942

(22) Filed: Jun. 1, 2017

(65) Prior Publication Data
US 2018/0074941 A1 Mar. 15, 2018

(30) Foreign Application Priority Data
Sep. 13, 2016 (JP) .................. 2016-178615

(51) Int. Cl.
| | |
|---|---|
| G06F 11/36 | (2006.01) |
| G06F 11/34 | (2006.01) |
| G06F 8/61 | (2018.01) |
| H04L 12/24 | (2006.01) |
| H04L 12/26 | (2006.01) |
| H04L 29/08 | (2006.01) |

(52) U.S. Cl.
CPC ............ *G06F 11/3664* (2013.01); *G06F 8/61* (2013.01); *G06F 11/34* (2013.01); *H04L 41/082* (2013.01); *H04L 43/045* (2013.01); *H04L 43/0876* (2013.01); *H04L 67/10* (2013.01)

(58) Field of Classification Search
CPC ......... G06F 11/3664; G06F 8/61; H04L 67/10
USPC ....................................................... 717/124
See application file for complete search history.

(56) References Cited

U.S. PATENT DOCUMENTS

| | | | |
|---|---|---|---|
| 9,455,876 B1* | 9/2016 | Grebenschikov | ....... H04L 41/20 |
| 9,594,546 B1* | 3/2017 | Todd | .......... G06F 8/60 |
| 9,652,364 B1* | 5/2017 | Kaila | .................... G06F 11/366 |
| 2012/0084407 A1* | 4/2012 | Soulios | ................. G06F 16/217 |
| | | | 709/220 |
| 2014/0026122 A1* | 1/2014 | Markande | .......... G06F 11/3664 |
| | | | 717/124 |

(Continued)

OTHER PUBLICATIONS

MultiCloud, Startign to Provide Multi-Cloud Integration Service, Applicant Provided NPL Reference #1 (Jul. 30, 2015).*

(Continued)

*Primary Examiner* — Lewis A Bullock, Jr.
*Assistant Examiner* — Theodore E Hebert
(74) *Attorney, Agent, or Firm* — Oliff PLC

(57) ABSTRACT

An information processing apparatus includes an extraction unit, a generation unit, a building unit, and a presentation unit. The extraction unit extracts, in accordance with similarity in a use condition for a first application that is a target application to be used by a user, a cloud service including a second application that has been used under a use condition similar to the use condition for the first application. The generation unit generates a parameter for satisfying the use condition for the first application in the cloud service. The parameter is generated from load information regarding a use result of the second application in the cloud service. The building unit builds, in the cloud service, an environment for implementing the first application by using the parameter. The presentation unit presents, to the user, a result of measurement of a performance of the first application in the environment.

6 Claims, 15 Drawing Sheets

(56) References Cited

U.S. PATENT DOCUMENTS

| | | | | |
|---|---|---|---|---|
| 2014/0214392 A1* | 7/2014 | Miller | ............... | G06F 17/5009 |
| | | | | 703/13 |
| 2014/0279201 A1* | 9/2014 | Iyoob | ............... | G06Q 30/0631 |
| | | | | 705/26.7 |
| 2014/0359128 A1* | 12/2014 | Bhattacharya | ...... | H04L 67/1097 |
| | | | | 709/226 |
| 2015/0142786 A1* | 5/2015 | Dawson | ............ | H04L 41/5003 |
| | | | | 707/723 |
| 2015/0301849 A1* | 10/2015 | Du | ............... | G06F 9/50 |
| | | | | 718/1 |
| 2015/0334155 A1* | 11/2015 | Bragstad | ............ | H04L 47/805 |
| | | | | 709/219 |
| 2015/0341416 A1* | 11/2015 | Chung | ............ | H04L 63/12 |
| | | | | 715/738 |
| 2016/0088019 A1* | 3/2016 | Li | ............... | G06F 21/53 |
| | | | | 726/1 |
| 2016/0099888 A1* | 4/2016 | Dunbar | ............ | H04L 67/1008 |
| | | | | 709/226 |
| 2016/0357885 A1* | 12/2016 | Cao | ............... | G06F 17/5009 |
| 2017/0242774 A1* | 8/2017 | Gopu | ............... | G06F 11/3433 |
| 2018/0074941 A1* | 3/2018 | Tokie | ............... | G06F 11/3664 |

OTHER PUBLICATIONS http://www.fujitsu.com/jp/group/feast/resources/news/press-releases/2015/0730.html; Starting to provide "Multi-Cloud Integration Service" that uses multi-cloud; Jul. 30, 2015.

https://osdn.jp/magazine/15/02/13/164400; Google USA releases benchmarking tool for cloud services, called "PerfKit Benchmarker"; Feb. 13, 2015.

* cited by examiner

FIG. 5

| | Use Condition Input | | |
|---|---|---|---|
| 510 — Monthly budget: | XXXXX yen | | |
| 520 — Application type: | Document management | | |
| 530 — Application name: | Document management B | | |
| 540 — Number of documents: | 1000000 | | |
| 550 — Number of users: | 10000 | | |
| 560 — Number of simultaneous accesses: | 100 | OK — 570 | Cancel — 580 |

Performance Comparison Report

Desired configuration: 50,000 yen desired monthly charge
Monthly charge
Service A  45,000 yen
Service B  38,000 yen Document download
Service A  100 seconds
Service B  120 seconds Document registration
Service A  200 seconds
Service B  220 seconds Document browsing
Service A  5 seconds
Service B  3 seconds

— 810

Recommended configuration (high performance)
Monthly charge
Service A  52,000 yen
Service B  55,000 yen Document download
Service A  80 seconds
Service B  70 seconds Document registration
Service A  90 seconds
Service B  120 seconds Document browsing
Service A  4 seconds
Service B  3 seconds

— 820

Recommended configuration (low charge)
Monthly charge
Service A  38,000 yen
Service B  32,000 yen Document download
Service A  110 seconds
Service B  130 seconds Document registration
Service A  220 seconds
Service B  230 seconds Document browsing
Service A  5 seconds
Service B  4 seconds

— 830

800

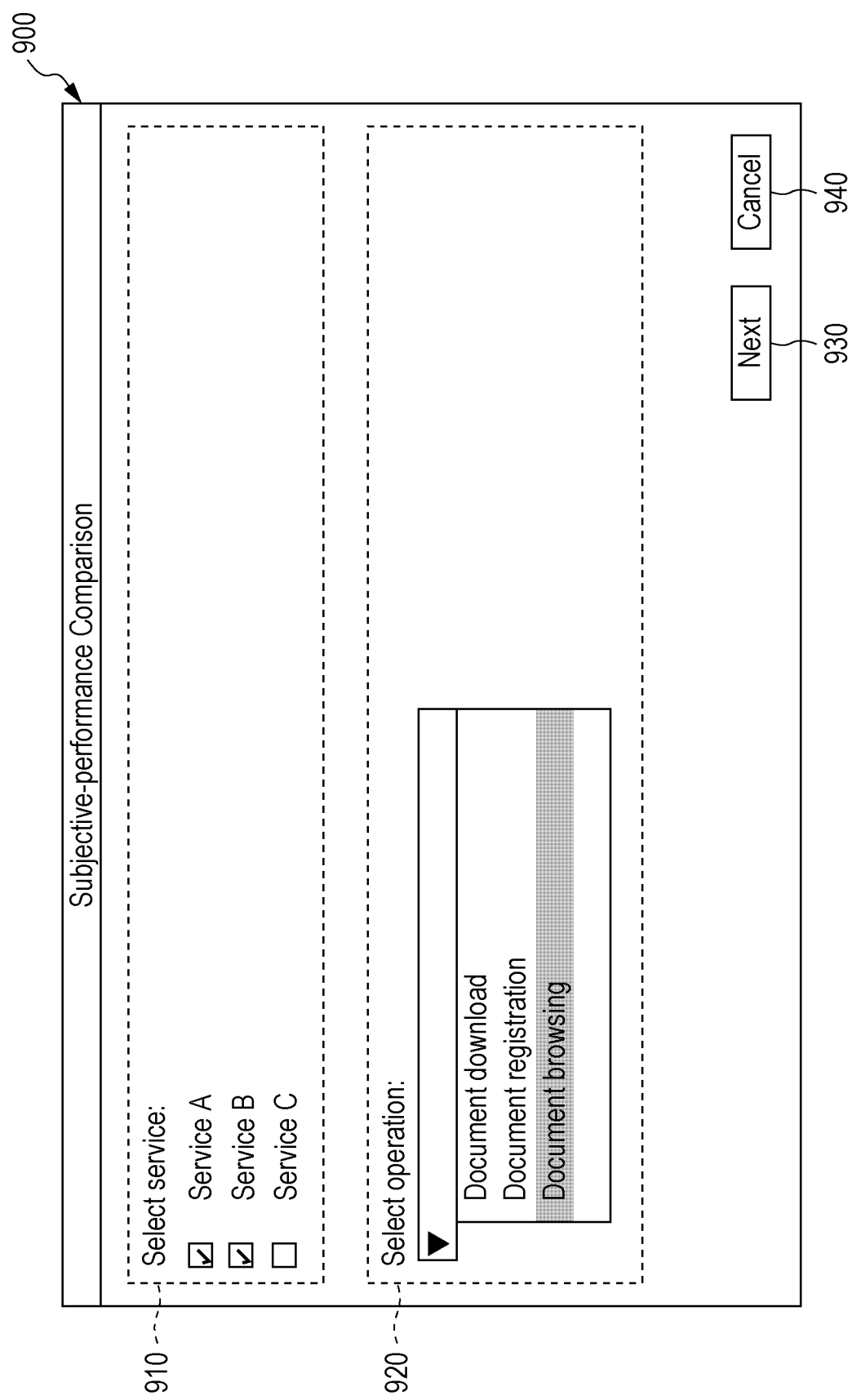

FIG. 12

| TIME (1210) | Processor Time (1220) | Available Bytes (1230) | Network InterfaceBytes Total/Sec (1240) |
|---|---|---|---|
| 02/02/2016 09:53:23.820 | 4.38395263 | 1184129024 | 503.5126996 |
| 02/02/2016 09:53:24.758 | 3.767696716 | 1179185152 | 222.4368611 |
| 02/02/2016 09:53:25.765 | 0 | 1177960448 | 613.4982864 |
| 02/02/2016 09:53:26.756 | 1.348515942 | 1178271744 | 507.9160284 |
| 02/02/2016 09:53:27.764 | 4.470709871 | 1177772032 | 450.6891003 |
| 02/02/2016 09:53:28.758 | 4.858299311 | 1176518656 | 24361.4927 |
| 02/02/2016 09:53:29.754 | 2.120714223 | 1167339520 | 27961.82451 |
| 02/02/2016 09:53:30.758 | 2.411540628 | 1166626816 | 1260.245441 |
| 02/02/2016 09:53:31.757 | 4.550302697 | 1168437248 | 191.4325645 |
| 02/02/2016 09:53:32.758 | 5.238876112 | 1154273280 | 127.9979137 |
| 02/02/2016 09:53:33.761 | 5.227993137 | 1153867776 | 127.4898741 |
| 02/02/2016 09:53:34.765 | 2.802467998 | 1154281472 | 440.2783401 |
| 02/02/2016 09:53:35.762 | 3.57407159 | 1153761280 | 28641.10965 |
| 02/02/2016 09:53:36.769 | 1.625527276 | 1154035712 | 39531.99088 |
| 02/02/2016 09:53:37.762 | 1.528328053 | 1153515520 | 406.4426414 |
| 02/02/2016 09:53:38.756 | 3.955578725 | 1153298432 | 253.20361 |
| 02/02/2016 09:53:39.767 | 0.750766607 | 1153175552 | 128.2492657 |

1200

| SUBSCRIBER ID | APPLICATION | NUMBER OF USERS | NUMBER OF PIECES OF DATA | AVERAGE DATA SIZE | OPENING TIME | CLOSING TIME |
|---|---|---|---|---|---|---|
| 0001 | DOCUMENT MANAGEMENT A | 100 | 10000 | 0.5 | 9:00 | 17:00 |
| 0002 | DOCUMENT MANAGEMENT A | 1000 | 100000 | 1 | 8:00 | 17:00 |
| 0003 | DOCUMENT MANAGEMENT B | 500 | 30000 | 10 | 10:00 | 18:00 |
| 0004 | E-MAIL SERVER A | 10000 | 10000 | 1.5 | 8:30 | 17:00 |
| 0005 | E-MAIL SERVER B | 500 | 20000 | 1 | 10:00 | 23:00 |
| 0006 | WEB SERVER A | 1000000 | 500 | 0.5 | 0:00 | 23:59 |

FIG. 14

| SERVICE NAME | REPRESENTATIVE MONTHLY CHARGE (YEN) | INSTANCE TYPE | CORE | MEMORY |
|---|---|---|---|---|
| SERVICE A | 10000 | m3.medium | 1 | 3.75 |
| SERVICE A | 20000 | m3.large | 2 | 7.5 |
| SERVICE A | 40000 | m3.xlarge | 4 | 15 |
| SERVICE B | 8000 | A1 | 1 | 1.75 |
| SERVICE B | 16000 | A2 | 2 | 3.5 |
| SERVICE B | 32000 | A3 | 4 | 7 |

FIG. 15

| SERVICE NAME | REPRESENTATIVE MONTHLY-GB-CHARGE (YEN) | DISK TYPE |
|---|---|---|
| SERVICE A | 0.1 | Magnetic |
| SERVICE A | 0.15 | SSD |
| SERVICE A | 0.2 | HIGH-SPEED SSD |
| SERVICE B | 0.08 | Magnetic |
| SERVICE B | 0.12 | SSD |
| SERVICE B | 0.2 | HIGH-SPEED SSD |

FIG. 16

| SERVICE NAME | REPRESENTATIVE MONTHLY-GB-CHARGE (YEN) | NETWORK TYPE |
|---|---|---|
| SERVICE A | 0.09 | 10 Mbps |
| SERVICE A | 0.1 | 50 Mbps |
| SERVICE A | 0.14 | 100 Mbps |
| SERVICE B | 0.08 | 15 Mbps |
| SERVICE B | 0.11 | 70 Mbps |
| SERVICE B | 0.13 | 120 Mbps |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-178615 filed Sep. 13, 2016.

BACKGROUND

Technical Field

The present invention relates to an information processing apparatus and a non-transitory computer readable medium.

Because various cloud services have been provided, users have a wide range to choose from. Web sites for explaining and comparing cloud services and the like disclose information regarding the performances of elements of the cloud services, such as the performances of a central processing unit (CPU), a network, and disk input/output (I/O).

However, it is difficult for a user to determine the influence of the performances of the elements on the performance of an application intended to be used by the user.

SUMMARY

According to an aspect of the invention, there is provided an information processing apparatus including an extraction unit, a generation unit, a building unit, and a presentation unit. The extraction unit extracts, in accordance with similarity in a use condition for a first application that is a target application to be used by a user, a cloud service including a second application that has been used under a use condition similar to the use condition for the first application. The generation unit generates a parameter for satisfying the use condition for the first application in the cloud service. The parameter is generated from load information regarding a use result of the second application in the cloud service. The building unit builds, in the cloud service, an environment for implementing the first application by using the parameter. The presentation unit presents, to the user, a result of measurement of a performance of the first application in the environment.

BRIEF DESCRIPTION OF THE DRAWINGS

An exemplary embodiment of the present invention will be described in detail based on the following figures, wherein:

FIG. 5 is an explanatory diagram illustrating an example display of a subscription screen;

FIG. 8 is an explanatory diagram illustrating an example performance comparison report;

FIG. 9 is an explanatory diagram illustrating an example display of a subjective-performance comparison operation screen;

FIG. 12 is an explanatory table illustrating an example data structure of a load information table;

FIG. 14 is an explanatory table illustrating an example data structure of an instance table;

FIG. 15 is an explanatory table illustrating an example data structure of a disk table;

FIG. 16 is an explanatory table illustrating an example data structure of a network table.

DETAILED DESCRIPTION

Hereinafter, an example of an exemplary embodiment to implement the invention will be described with reference to the drawings.

Figure 1:
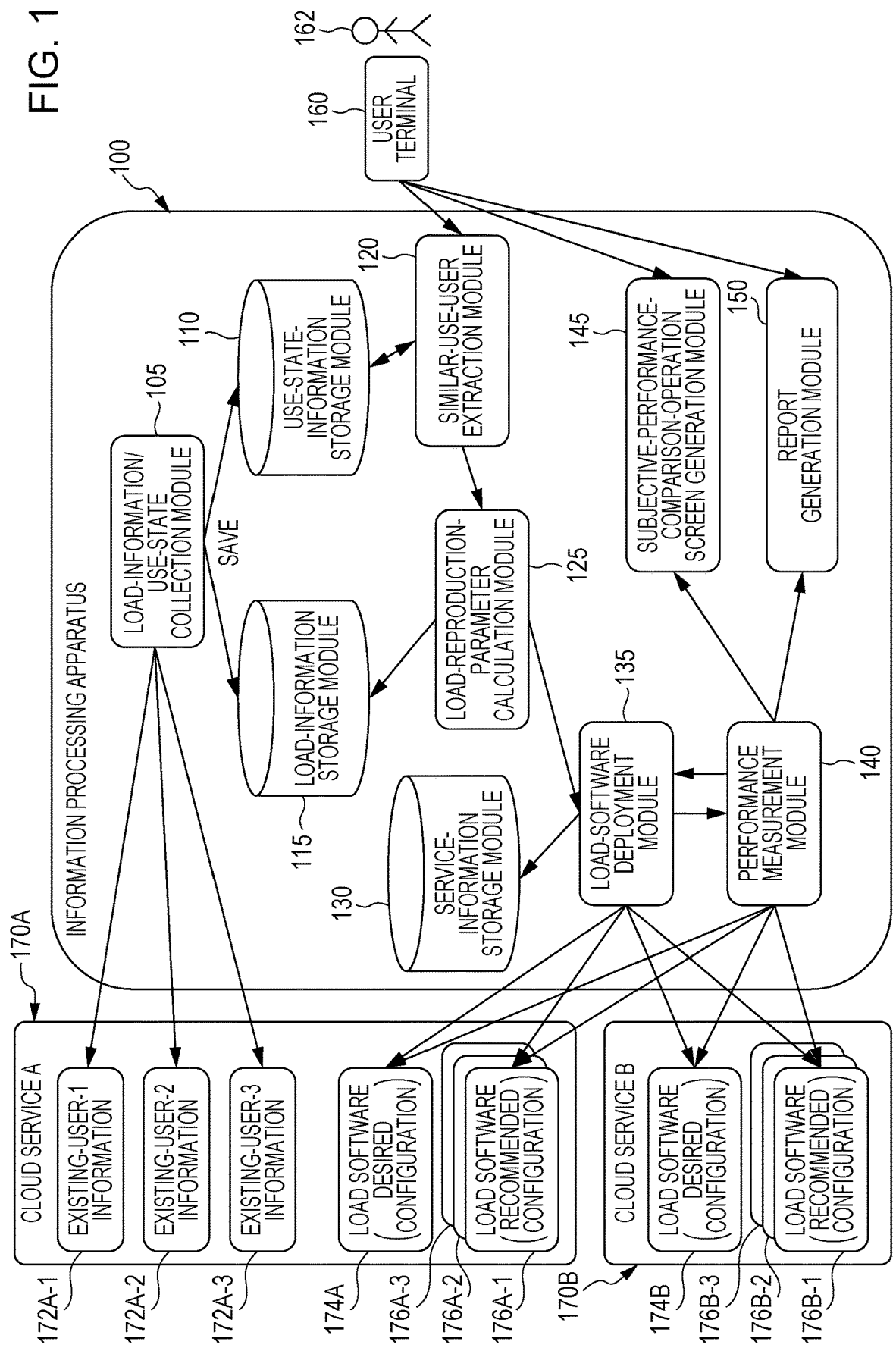
FIG. 1 is a diagram of an example configuration of conceptual modules of the exemplary embodiment.

FIG. 1 illustrates a configuration example of conceptual modules of the exemplary embodiment.

Note that the term "module" refers to generally logically separable components of software (computer programs) and hardware or the like. Modules in the exemplary embodiment thus refer to not only modules in a computer program but also modules in a hardware configuration. Accordingly, the description of the exemplary embodiment also serves as a description of a computer program for causing a computer to function as the modules (a program for causing a computer to execute steps, a program for causing a computer to function as components, and a program for causing a computer to implement functions) as well as a system and a method therefor. Meanwhile, the term "to store" and other terms equivalent to "to store" are used in descriptions. In a case where the exemplary embodiment describes a computer program, the term means storing something in a storage device or controlling something so as to store something in a storage device. The modules are provided for respective functions on a one-to-one basis. However, in implementing the functions, one program may constitute one module; one program may constitute multiple modules; and multiple programs may constitute one module. In addition, one computer may run multiple modules, and multiple computers may run one module in a distributed or parallel processing environment. Note that one module may include another module. Moreover, the term "connection" is used for not only a physical connection but also a logical connection (such as data exchange, instructions, or a reference relationship among data pieces). The term "predetermined" refers to having been determined before target processing. This term is used in such a manner as to include the meaning of being determined according to the situation at the determination time or to the situation thus far only before target processing, regardless of whether before or even after the start of processing in the exemplary embodiment. Meanwhile, in a case of multiple "predetermined values", the values may be different from one another, or two or more of the values may be the same (including all of the values). Moreover, an expression meaning "if A, then B" is used in such a manner as to mean that "it is determined whether A holds true, and if it is determined that A holds true, then B is performed". However, this excludes a case where the determination of whether A holds true is not needed.

A system or a device includes not only a configuration in which multiple computers, hardware, devices, and the like are connected to each other through a communication unit such as a network (including a communication connection on a one-to-one basis), but also a configuration in which a computer, hardware, a device, or the like is implemented. The terms "device" and "system" are used as terms having the same meaning. It goes without saying that the "system" does not include a mere social "system" built in accordance with agreements worked out by humans.

In addition, to perform a processing operation or multiple processing operations in each module, the module reads target information from a storage device for each processing, performs the processing, and writes a processing result to the storage device. Accordingly, explanations of reading the content from the storage device before processing and writing the content to the storage device after the processing are omitted in some cases. Here, the storage device may include a hard disk, a random access memory (RAM), an external storage medium, a storage device connected through a communication network, a register in a CPU, and other devices.

An information processing apparatus 100 that is the exemplary embodiment compares multiple cloud services and includes, as illustrated in the example in FIG. 1, a load-information/use-state collection module 105, a use-state-information storage module 110, a load-information storage module 115, a similar-use-user extraction module 120, a load-reproduction-parameter calculation module 125, a service-information storage module 130, a load-software deployment module 135, a performance measurement module 140, a subjective-performance-comparison-operation screen generation module 145, and a report generation module 150. The information processing apparatus 100 is connected to a user terminal 160 and multiple cloud services 170 via a communication network.

The information processing apparatus 100 functions as a cloud service selection system.

For example, a vendor (also referred to as a hosting service provider or the like) who agents for and supports introduction and management of applications in multiple cloud services (also referred to as a multi-cloud) provides the information processing apparatus 100. The information processing apparatus 100 provides general end users (hereinafter, also simply referred to as users) with performance information to enable them to determine a cloud service to be used. In particular, even a general user not having deep knowledge of information technology (IT) may acquire easy-to-understand performance comparison information that indicates a performance similar to the actual performance of an application intended to be used by the user. The user may thereby select an appropriate one of multiple cloud vendors.

Note that the term "cloud services" refers to functions and activities provided by a computer (including an apparatus having the computer incorporated therein) and software to the user, another apparatus, other software, and the like through a communication network and also refers to computer resources to implement the functions and activities. Accordingly, the cloud services do not include a service provided by only humans.

The load-information/use-state collection module 105 is connected to the use-state-information storage module 110 and the load-information storage module 115. The load-information/use-state collection module 105 acquires load information and use state information regarding a running application from one of the cloud services 170 (or from the cloud services 170). The load information is stored in the load-information storage module 115, and the use state information is stored in the use-state-information storage module 110.

Figure 13:
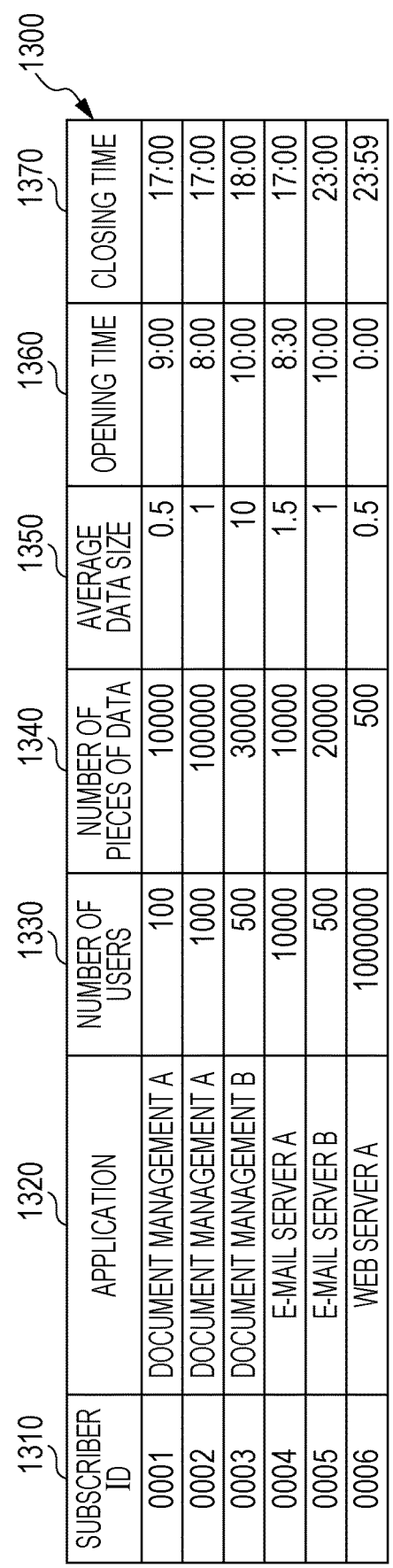
FIG. 13 is an explanatory table illustrating an example data structure of a use state table.

The use-state-information storage module 110 is connected to the load-information/use-state collection module 105 and the similar-use-user extraction module 120. The use-state-information storage module 110 stores therein the use state information received from the load-information/use-state collection module 105. The use-state-information storage module 110 stores, for example, a use state table 1300. FIG. 13 is an explanatory table illustrating an example data structure of the use state table 1300. The use state table 1300 has a subscriber identification (ID) column 1310, an application column 1320, a number-of-users column 1330, a number-of-pieces-of-data column 1340, an average data-size column 1350, an opening-time column 1360, and a closing-time column 1370. The subscriber ID column 1310 stores therein information (a subscriber ID) for uniquely identifying a subscriber in the exemplary embodiment. The application column 1320 stores therein the type of an application (may be an application ID or the like) used by the subscriber. The number-of-users column 1330 stores therein the number of users who use the application. The number-of-pieces-of-data column 1340 stores therein the number of pieces of data used by the application. The average data-size column 1350 stores therein an average data size of the pieces of data used by the application. The opening-time column 1360 stores therein an opening time at which a user who uses the application (or the company or the like of the user) starts working. The closing-time column 1370 stores therein a closing time at which the user who uses the application (or the company or the like of the user) stops working. Pieces of information in the opening-time column 1360 and the closing-time column 1370 indicate a time range in which the application is typically used.

The load-information storage module 115 is connected to the load-information/use-state collection module 105 and the load-reproduction-parameter calculation module 125. The load-information storage module 115 stores therein the load information received from the load-information/use-state collection module 105. The load-information storage module 115 stores, for example, an operation history table 1100 and a load information table 1200.

Figure 11:
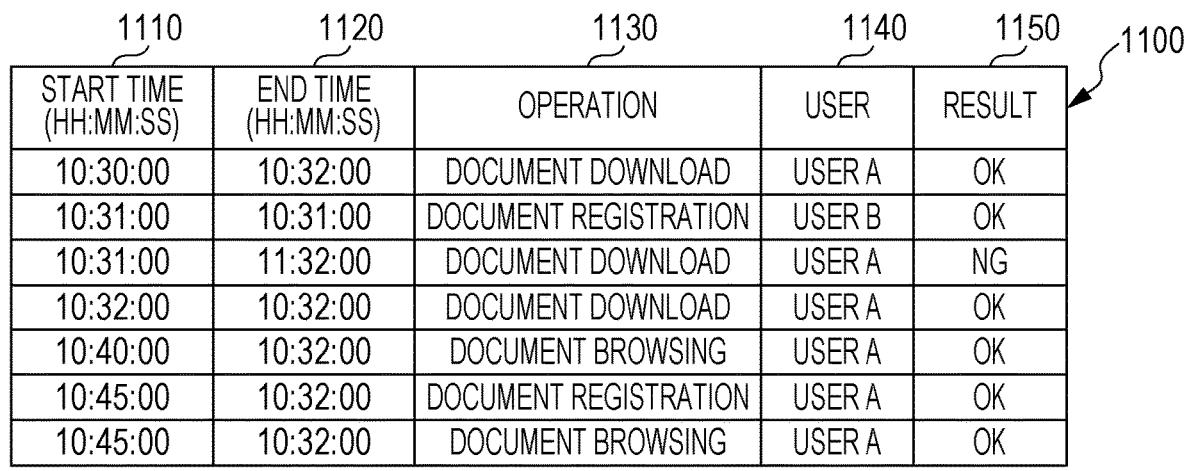
FIG. 11 is an explanatory table illustrating an example data structure of an operation history table.

FIG. 11 is an explanatory table illustrating an example data structure of the operation history table 1100. The operation history table 1100 stores therein a history of user operations of each application that are performed by users. The operation history table 1100 has a start-time column 1110, an end-time column 1120, an operation column 1130, a user column 1140, and a result column 1150. The start-time column 1110 stores therein the start time of a process caused by an operation of a user. The end-time column 1120 stores therein the end time of the process caused by the operation. The operation column 1130 stores therein the operation. The user column 1140 stores therein the user who performs the operation. The result column 1150 stores therein the success or failure (process result) of the process caused by the operation.

FIG. 12 is an explanatory table illustrating an example data structure of the load information table 1200. The load information table 1200 stores therein a load history of each application. The load information table 1200 has a time column 1210, a Processor Time column 1220, an Available Bytes column 1230, and a Network InterfaceBytes Total/Sec column 1240. The time column 1210 stores therein time. The Processor Time column 1220 stores therein Processor Time (CPU load) at the time in the time column 1210. The Available Bytes column 1230 stores therein Available Bytes (a memory free space) at the time. The Network InterfaceBytes Total/Sec column 1240 stores therein Network InterfaceBytes Total/Sec (an amount of data transmitted or received via the communication network and an amount of transfer via the network) at the time.

The similar-use-user extraction module 120 is connected to the use-state-information storage module 110, the load-reproduction-parameter calculation module 125, and the user terminal 160. The similar-use-user extraction module 120 extracts, in accordance with similarity in use conditions for a first application that is a target application to be used by a user, a cloud service including a second application that has been used under use conditions similar to the use conditions for the first application. The first application and the second application are similar to each other. Note that the similarity includes identicalness.

For example, the similar-use-user extraction module 120 receives, from the user terminal 160, use conditions designated by a new user 162 who is an end user. The similar-use-user extraction module 120 extracts cases where applications (in the cloud services 170) that are provided by an agent and used by users are used under use conditions similar to the designated use conditions. Specifically, the similar-use-user extraction module 120 extracts second applications exhibiting use conditions similar to those for the first application. Examples of the use conditions include a type of a first application, an amount of data, and the number of simultaneous accesses. More specifically, each similar second application thus extracted is of the same application type as the designated application type, and a difference in the data amount, the number of simultaneous accesses, and the like from those designated by the new user 162 is equal to or lower than a predetermined threshold. Examples of the application type include document management, an e-mail server, a Web server, accounting software, and a video delivery site. Examples of the data amount include the number of files and a file size.

The process executed by the similar-use-user extraction module 120 is used to simulate a real state of load on an application actually used by the user.

The load-reproduction-parameter calculation module 125 is connected to the load-information storage module 115, the similar-use-user extraction module 120, and the load-software deployment module 135. From the load information regarding results of using the second applications extracted in the cloud services by the similar-use-user extraction module 120, the load-reproduction-parameter calculation module 125 generates parameters for satisfying the use conditions (the use conditions designated by the new user 162) in the cloud service.

The load-reproduction-parameter calculation module 125 may also vary each parameter to generate multiple parameters by raising or lowering the level of the value of the parameter.

For example, the load-reproduction-parameter calculation module 125 acquires, from the load-information storage module 115, the load information regarding the similar cases extracted by the similar-use-user extraction module 120. Specifically, the information includes CPU usage, memory utilization, network transfer amount, and the like. Note that the load information is stored in advance in the load-information storage module 115 to be acquired in association (linkage) with an operation. Specifically, the start-time column 1110 and the end-time column 1120 of the operation history table 1100 and the time column 1210 of the load information table 1200 are used to associate the load information with the corresponding operation.

To reproduce load information associated with a typical operation, the load-reproduction-parameter calculation module 125 generates CPU-load software, memory-load software, network software, and other pieces of software and calculates and sets a parameter on a per-software basis. The "typical operation" is predetermined on a per-application-type basis. For example, typical operations predetermined for a document management application are a document registration operation, a document browsing operation, and a document download operation.

Note that to generate load software, an existing technique (such as a benchmarking technique) may be used. For example, a performance measurement tool for disk I/O (specifically, such as fio) may be used. In such a technique, simultaneously allocating multiple threads and processes to each of I/O processes enables benchmarking of accesses performed on a per-type basis in the file system of a cloud service 170. For example, this enables simulation of a case of simultaneously executing four background processes (two queries, one writer, and one piece of update data (reading and writing)).

The service-information storage module 130 is connected to the load-software deployment module 135. The service-information storage module 130 stores therein, for example, an instance table 1400, a disk table 1500, and a network table 1600. FIG. 14 is an explanatory table illustrating an example data structure of the instance table 1400. The instance table 1400 stores therein information regarding a CPU in each cloud service. The instance table 1400 has a service name column 1410, a representative monthly charge (yen) column 1420, an instance type column 1430, a core column 1440, and a memory column 1450. The service name column 1410 stores therein the service name (may also be the cloud service ID) of each cloud service. The representative monthly charge (yen) column 1420 stores therein a representative charge for the cloud service. The instance type column 1430 stores therein the instance type (CPU type) of the cloud service. The core column 1440 stores therein the number of cores of the cloud service. The memory column 1450 stores therein the memory capacity of the cloud service.

FIG. 15 is an explanatory table illustrating an example data structure of the disk table 1500. The disk table 1500 has a service name column 1510, a representative monthly-gigabyte (GB)-charge (yen) column 1520, and a disk type column 1530. The disk table 1500 stores therein information regarding the disk of each cloud service. The service name column 1510 stores therein the service name of the cloud service. The representative monthly-GB-charge (yen) column 1520 stores therein a representative charge for the cloud service (for example, a monthly charge per GB (yen)). The disk type column 1530 stores therein the disk type (such as magnetic or solid state disk (SSD)) in the cloud service.

FIG. 16 is an explanatory table illustrating an example data structure of the network table 1600.

The network table 1600 has a service name column 1610, a representative monthly-GB-charge (yen) column 1620, and a network type column 1630. The service name column 1610 stores therein the service name of each cloud service.

The representative monthly-GB-charge (yen) column 1620 stores therein a representative charge for the cloud service (for example, a monthly charge per GB (yen)). The network type column 1630 stores therein the network type (such as a transmission speed) in the cloud service.

The load-software deployment module 135 is connected to the load-reproduction-parameter calculation module 125, the service-information storage module 130, and the performance measurement module 140. The load-software deployment module 135 builds, in each cloud service (each cloud service extracted by the similar-use-user extraction module 120), an environment for implementing the first application in accordance with the parameters generated by the load-reproduction-parameter calculation module 125.

For example, the load-software deployment module 135 builds, in each cloud service 170, an execution environment with specifications close to the specifications of the corresponding extracted similar case and deploys a set of load software and an adjusted configuration of the load software in each cloud service 170 to be compared.

Specifically, the load-software deployment module 135 deploys, for a cloud service A 170A, load software (desired configuration) 174A (an example of the set of load software and a configuration) and load software (recommended configuration) 176A and deploys, for a cloud service B 170B, load software (desired configuration) 174B and load software (recommended configuration) 176B. Thereafter, the performance measurement module 140 measures the performance of a target application in the cloud service A 170A by using the load software (desired configuration) 174A and the load software (recommended configuration) 176A and measures the performance of the target application in the cloud service B 170B by using the load software (desired configuration) 174B and the load software (recommended configuration) 176B.

Processing performed by the load-software deployment module 135 enables easier deployment than that of an actual application intended to be used by the new user 162 and data therefor and also eliminates the need to purchase the application.

The performance measurement module 140 is connected to the load-software deployment module 135, the subjective-performance-comparison-operation screen generation module 145, and the report generation module 150. In each environment built by the load-software deployment module 135, the performance measurement module 140 measures the performance of the first application. It goes without saying that the environment is the environment of each cloud service extracted by the similar-use-user extraction module 120.

For example, the performance measurement module 140 reproduces load caused by a typical operation in the environment in which a state of the load on the use by a user who has already used the cloud service (also referred to as an existing user) under use conditions similar to the use conditions designated by the new user 162 are reproduced. The performance measurement module 140 then measures a time from a process start time to a process end time. Specifically, for example, the measurement result is that 200 seconds and 4 seconds are taken for document downloading and document browsing, respectively, in the cloud service A 170A and that 220 seconds and 3 seconds are taken for document downloading and document browsing, respectively, in the cloud service B 170B.

The subjective-performance-comparison-operation screen generation module 145 is connected to the performance measurement module 140 and the user terminal 160.

The subjective-performance-comparison-operation screen generation module 145 may control the performance measurement module 140 to execute an application to enable a user to experience the performance of the application in the environment built by the load-software deployment module 135.

The subjective-performance-comparison-operation screen generation module 145 may be configured to select load in accordance with an operation performed by the user. For example, periods of execution time of a cloud service may be presented as the "selectable load".

For example, to cause the new user 162 to experience a performance difference between the applications, the subjective-performance-comparison-operation screen generation module 145 provides the user terminal 160 with a verification client dynamically including an execution button for various scenarios (such as for the load software (desired configuration) 174A, the load software (recommended configuration) 176A, the load software (desired configuration) 174B, and the load software (recommended configuration) 176B). The verification client performs each scenario in the designated execution environment and transmits a response to the information processing apparatus 100.

Processing performed by the subjective-performance-comparison-operation screen generation module 145 enables a general user who does not have through knowledge of the performance of the components of the cloud services 170 to intuitively know the performance difference.

The report generation module 150 is connected to the performance measurement module 140 and the user terminal 160. The report generation module 150 transmits the results of the measurement performed by the performance measurement module 140 to the user terminal 160 and thereby presents the results to the new user 162.

The report generation module 150 may also present, to the user, results of measurement performed using multiple parameters.

The report generation module 150 may also present results of measurements using not only the configuration based on the use conditions but also a configuration with a high performance (high-performance configuration) or a configuration leading to a low charge (also referred to as a low-charge configuration). Specifically, the performance in the configuration based on the use conditions presented by the user is presented, and the performance in the high-performance configuration or the low-charge configuration is presented. Note that the "high-performance configuration" has a higher performance than the performance in the configuration based on the use conditions presented by the user, and the "low-charge configuration" has a lower charge than the charge of the configuration based on the use conditions presented by the user.

Processing performed by the report generation module 150 automatically runs applications in multiple cloud services more easily than in a case where the performance of the actual application intended to be used by the new user 162 is measured with the application load state being reproduced, and this thus enables comparison between the cloud services.

The user terminal 160 is connected to the similar-use-user extraction module 120, the subjective-performance-comparison-operation screen generation module 145, and the report generation module 150 of the information processing apparatus 100 via the communication network. The user terminal 160 is a personal computer, a mobile information communication apparatus, or the like used by the new user 162.

In accordance with an operation performed by the new user 162, the user terminal 160 inputs the use conditions to be used by the similar-use-user extraction module 120. The report generation module 150 generates a report of performances to be observed in a case where an application is implemented in each cloud service in accordance with the use conditions. The report generation module 150 transmits the report to the user terminal 160. The user terminal 160 displays the received report.

In accordance with a subjective-performance comparison operation performed by the new user 162, the user terminal 160 inputs the operation to the subjective-performance-comparison-operation screen generation module 145. The subjective-performance-comparison-operation screen generation module 145 then causes the application to be executed in accordance with the subjective-performance comparison operation in the cloud service and transmits the result of the execution to the user terminal 160.

The cloud services 170 are connected to the information processing apparatus 100 via the communication network and provides the information processing apparatus 100 and the user terminal 160 with the corresponding cloud service.

The cloud service A 170A stores therein, as information (including the use conditions or the like) regarding a user using the cloud service A 170A, existing-user-1 information 172A-1, existing-user-2 information 172A-2, existing-user-3 information 172A-3, and other pieces of information. The cloud service A 170A has the load software (desired configuration) 174A, load software (recommended configuration) 176A-1, load software (recommended configuration) 176A-2, load software (recommended configuration) 176A-3, and the like that are implemented by the information processing apparatus 100. The load software (desired configuration) 174A and the like are executed to measure performances.

The cloud service B 170B has the load software (desired configuration) 174B, load software (recommended configuration) 176B-1, load software (recommended configuration) 176B-2, load software (recommended configuration) 176B-3, and the like that are implemented by the information processing apparatus 100. The load software (desired configuration) 174B and the like are executed to measure performances.

Figure 2:
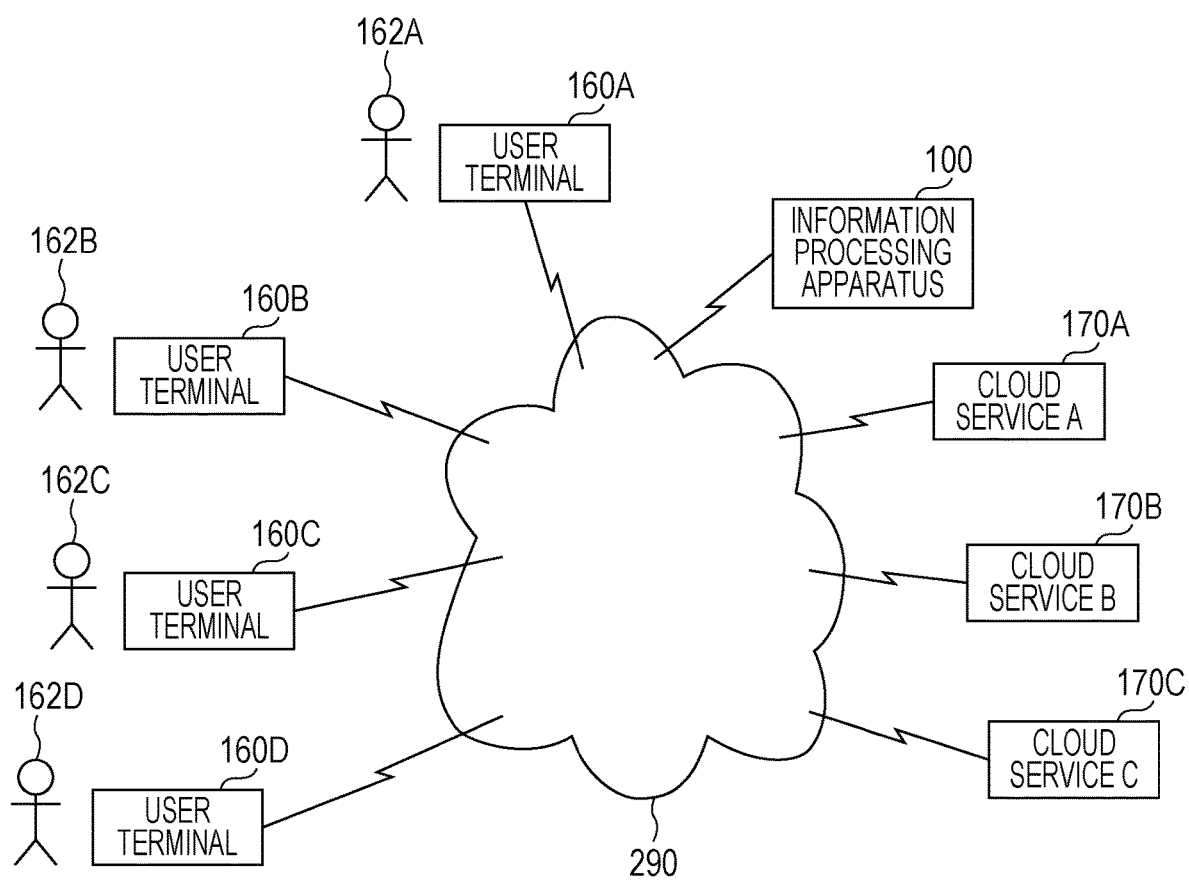
FIG. 2 is an explanatory diagram illustrating an example configuration of a system using the exemplary embodiment.

FIG. 2 is an explanatory diagram illustrating an example configuration of a system using the exemplary embodiment.

The information processing apparatus 100, a user terminal 160A, a user terminal 160B, a user terminal 160C, a user terminal 160D, the cloud service A 170A, the cloud service B 170B, and a cloud service C 170C are connected to one another via a communication network 290. The communication network 290 may be a wireless network, a wired network, or a combined network of these and may be, for example, the Internet serving as a communication infrastructure, an intranet, or the like. In addition, the information processing apparatus 100 itself may be implemented as a cloud service.

A new user 162B, a new user 162C, and a new user 162D have introduced and used applications in the cloud services 170, and a new user 162A intends to introduce an application in a cloud service 170. Cases (applications and cloud services 170) exhibiting use conditions similar to the use conditions intended by the new user 162A are extracted. Parameters for evaluating performances in accordance with the use conditions are set, the performances are evaluated, and results are displayed to the new user 162A (the user terminal 160A).

To compare the performances of the cloud services 170 without the information processing apparatus 100, for example, deployment and verification of a real application in a multi-cloud multiple times involve high cost and a long time. In addition, deployment and verification using only a test tool do not lead an intuitive result for the new user 162.

The information processing apparatus 100 performs deployment and verification easily even in the multi-cloud and provides intuitive performance information.

Specifically, the information processing apparatus 100 generates performance evaluation software on the basis of an already implemented application and actually measures the performance of the application.

Figure 3:
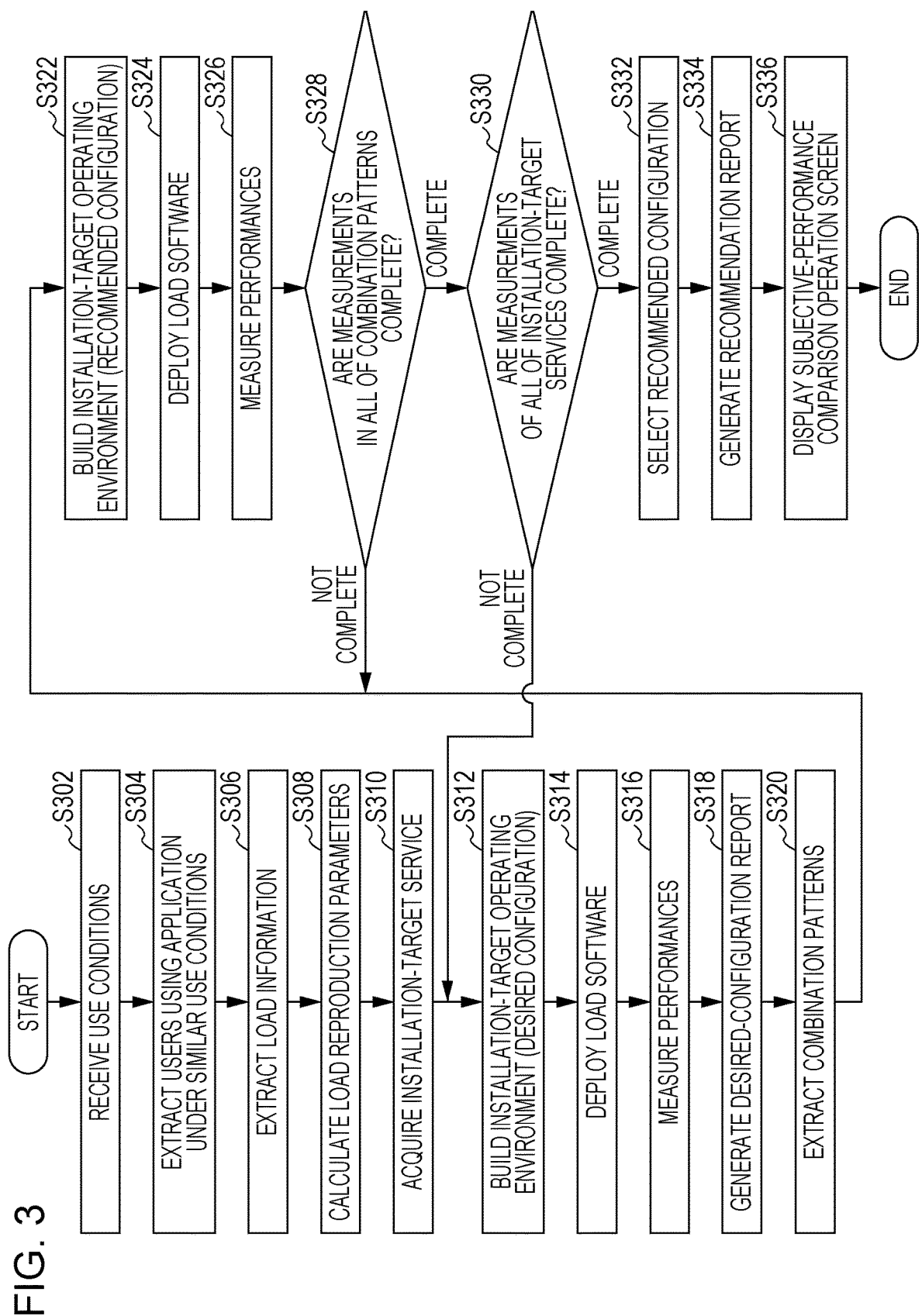
FIG. 3 is a flowchart illustrating an example of a process performed by the exemplary embodiment.

FIG. 3 is a flowchart illustrating an example of a process performed by the exemplary embodiment.

In step S302, the similar-use-user extraction module 120 receives use conditions.

In step S304, the similar-use-user extraction module 120 extracts users using applications under use conditions similar to the received use conditions.

In step S306, the load-reproduction-parameter calculation module 125 extracts load information from the load-information storage module 115.

In step S308, the load-reproduction-parameter calculation module 125 calculates load reproduction parameters.

In step S310, the load-software deployment module 135 acquires information regarding one or more services that are each a target for installing load software from the service-information storage module 130.

In step S312, the load-software deployment module 135 builds an installation-target operating environment (desired configuration) for each service.

In step S314, the load-software deployment module 135 deploys the load software.

In step S316, the performance measurement module 140 measures the performance of a target application.

In step S318, the report generation module 150 generates a desired-configuration report.

In step S320, the load-software deployment module 135 extracts one of combination patterns for building an installation-target operating environment (recommended configuration).

In step S322, the load-software deployment module 135 builds the installation-target operating environment (recommended configuration).

In step S324, the load-software deployment module 135 deploys the load software.

In step S326, the performance measurement module 140 measures the performance of the target application in the load software.

In step S328, the performance measurement module 140 determines whether measurements in all of the combination patterns are complete. If measurements in all of the combination patterns are complete, the processing proceeds to step S330. If measurements in all of the combination patterns are not complete, the processing returns to step S322.

In step S330, the performance measurement module 140 determines whether measurements in all of the installation-target services are complete. If measurements in all of the installation-target services are complete, the processing proceeds to step S332. If measurements in all of the installation-target services are not complete, the processing returns to step S312.

In step S332, the report generation module 150 selects one or more recommended configurations.

In step S334, the report generation module 150 generates a recommendation report.

In step S336, the subjective-performance-comparison-operation screen generation module 145 displays a subjective-performance comparison operation screen.

Figure 4:
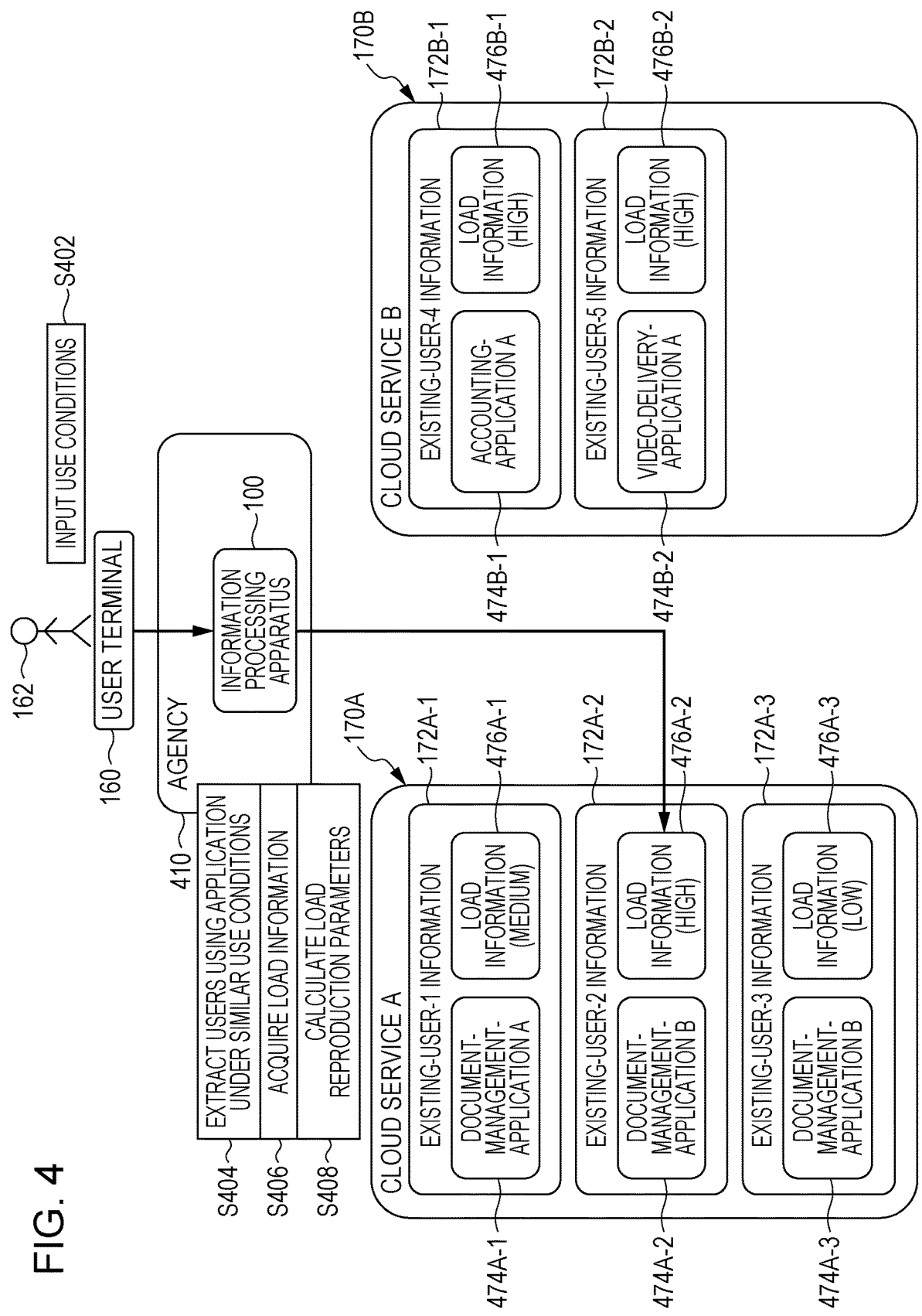
FIG. 4 is an explanatory diagram illustrating an example process performed by the exemplary embodiment.

FIG. 4 is an explanatory diagram illustrating an example process performed by the exemplary embodiment. The cloud service A 170A has the existing-user-1 information 172A-1, the existing-user-2 information 172A-2, and the existing-user-3 information 172A-3. The existing-user-1 information 172A-1 has a document-management-application A 474A-1 and load information (medium) 476A-1. The existing-user-2 information 172A-2 has a document-management-application B 474A-2 and load information (high) 476A-2. The existing-user-3 information 172A-3 has a document-management-application B 474A-3 and load information (low) 476A-3. The cloud service B 170B has existing-user-4 information 172B-1 and existing-user-5 information 172B-2. The existing-user-4 information 172B-1 has an accounting-application A 474B-1 and load information (high) 476B-1. The existing-user-5 information 172B-2 has a video-delivery-application A 474B-2 and load information (high) 476B-2.

In step S402, a user inputs use conditions. For example, the new user 162 who is a new user requests an agency 410 to select an optimum cloud service. Specifically, the user terminal 160 connects to the information processing apparatus 100 and displays a subscription screen 500 in accordance with an instruction from the information processing apparatus 100. As illustrated in the example in FIG. 5, the new user 162 inputs desired use conditions on the subscription screen 500 displayed by the user terminal 160.

FIG. 5 is an explanatory diagram illustrating an example display of the subscription screen 500. A monthly budget field 510, an application type field 520, an application name field 530, a number-of-documents field 540, a number-of-users field 550, a number-of-simultaneous-accesses field 560, an OK button 570, and a Cancel button 580 are displayed on the subscription screen 500.

In accordance with an operation performed by the new user 162, for example, "XXXXX yen" is input in the monthly budget field 510; "document management", the application type field 520; "document management B", the application name field 530; "1000000", the number-of-documents field 540; "10000", the number-of-users field 550; and "100", the number-of-simultaneous-accesses field 560. Note that the display for inputting the conditions in the application name field 530 to the number-of-simultaneous-accesses field 560 may vary depending on the application type.

In step S404, one or more users using an application under similar use conditions are extracted. The information processing apparatus 100 searches the use-state-information storage module 110 for an existing user (for example, the existing-user-2 information 172A-2) who uses an application under use conditions similar to the input use conditions.

In step S406, load information is acquired. The information processing apparatus 100 acquires load information associated with the extracted user (for example, the existing-user-2 information 172A-2) from the load-information storage module 115. Note that the load-information storage module 115 includes load information tables (the operation history table 1100 and the load information table 1200) based on an operation history and a performance log.

The operation history table 1100 is generated by mapping, extracting, from application-specific operation logs, and accumulating operations specified as typical operations by the selection system on a per-application-type basis. For example, an application-specific operation log recorded by the function of the document management application B includes operations for document download, document registration, document browsing, reference registration, authorization change, update-history reference, attribute change, state change, and the like. Among these operations, operations for document download, document registration, document browsing, and the like are managed by using the operation history of the selection system.

From the load information table 1200, the information processing apparatus 100 extracts (1) average load distribution during working hours and (2) load caused by a typical operation performed alone (also referred to as an alone operation that does not involve load caused by any other operation).

In step S408, load reproduction parameters are calculated.

To reproduce average load on the system, the information processing apparatus 100 determines parameters for load software from "(1) average load distribution during working hours".

Each parameter is set for the load software to obtain values close to index values in a corresponding one of the Processor Time column 1220, the Available Bytes column 1230, and the Network InterfaceBytes Total/Sec column 1240 in the load information table 1200 for operations that is illustrated in the example in FIG. 12, and dummy load is then applied. It is desirable to generate load software in which an index acquirable by the load software is acceptable as an input value without any special processing. However, if the acquirable index and a value acceptable as the input value do not match, a conversion process may be executed.

Subsequently, to reproduce load caused by a typical operation performed alone, parameters for load software are determined from "(2) load caused by a typical operation performed alone (without load caused by any other operation)". The load software for the average load and the load software for the alone-operation load run independently from each other.

Although the example in which the alone operation and the applying of background load are performed independently from each other has been described, a foreground process and a background process may be simulated in one piece of load software.

Figure 6:
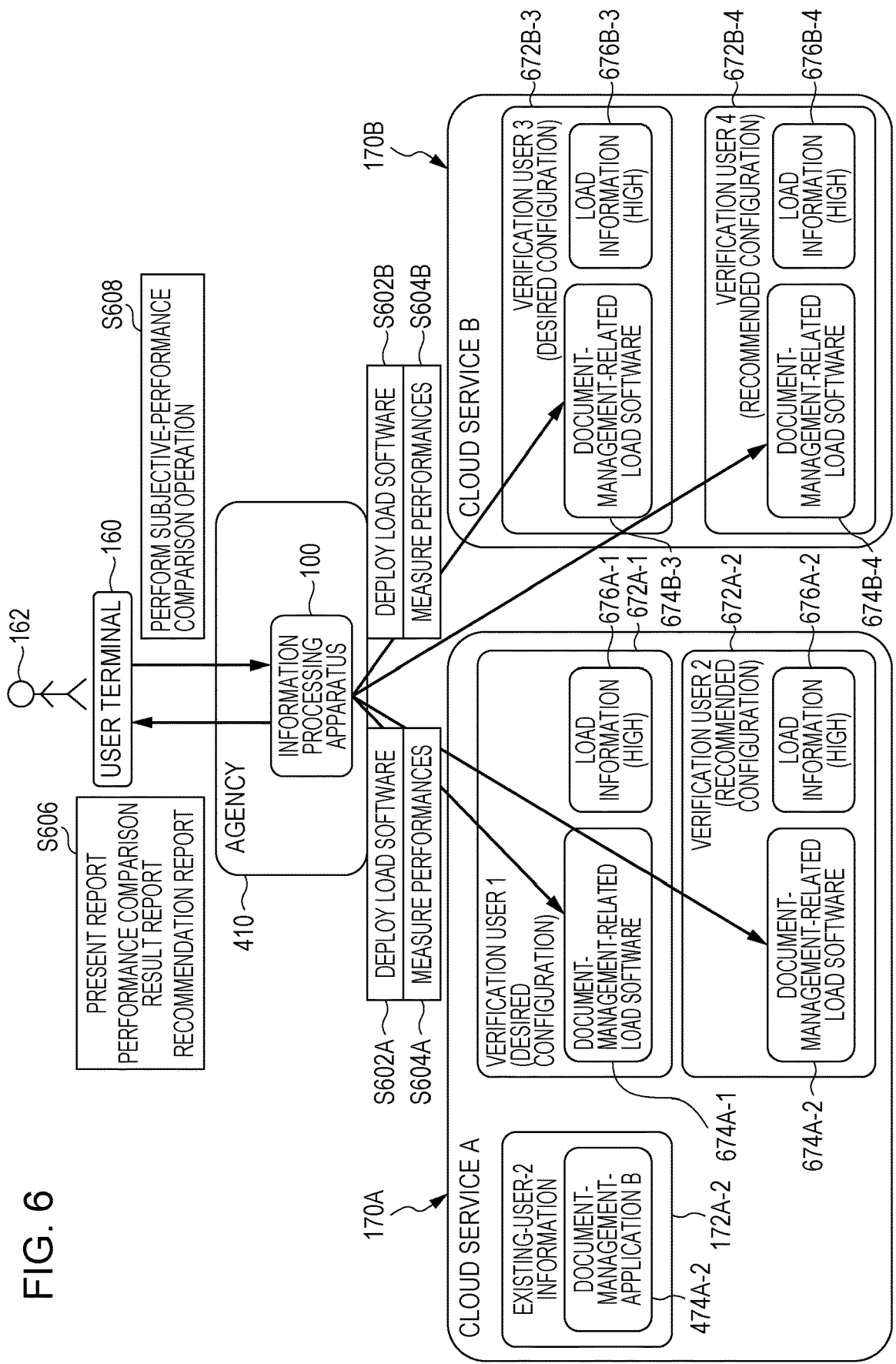
FIG. 6 is an explanatory diagram illustrating an example process performed by the exemplary embodiment.

Subsequently, a process illustrated in the example in FIG. 6 is executed. FIG. 6 is an explanatory diagram illustrating an example process performed by the exemplary embodiment.

In steps S602A and S602B, the generated load software is deployed in the cloud service A 170A and the cloud service B 170B.

For example, the load software is automatically deployed together with the parameters determined in step S408 illustrated in FIG. 4 in cloud services to be compared. First, operating environment information satisfying the use conditions intended by the new user 162 is extracted from the service-information storage module 130 on a per-service basis, and operating environments are built.

For example, if a desired condition in which a monthly budge is "30000 yen/month" is set, operating environments that are "m3.large, high-speed SSD, and 100 Mbps" and "A3, high-speed SSD, and 120 Mbps" are respectively built in the cloud service A 170A and the cloud service B 170B.

Subsequently, sets of load software and parameters are transferred to the built execution environments (instances), and the pieces of software are installed therein. In the example in FIG. 6, a verification user 1 (desired configuration) 672A-1 and a verification user 2 (recommended configuration) 672A-2 are transferred to the cloud service A 170A, and a verification user 3 (desired configuration) 672B-3 and a verification user 4 (recommended configuration) 672B-4 are transferred to the cloud service B 170B. The verification user 1 (desired configuration) 672A-1 has document-management-related load software 674A-1 and load information (high) 676A-1. The verification user 2 (recommended configuration) 672A-2 has document-management-related load software 674A-2 and load information (high) 676A-2. The verification user 3 (desired configuration) 672B-3 has document-management-related load software 674B-3 and load information (high) 676B-3. The verification user 4 (recommended configuration) 672B-4 has document-management-related load software 674B-4 and load information (high) 676B-4.

In steps S604A and S604B, performances are measured.

Specifically, after the load software is deployed in the cloud service A 170A and the cloud service B 170B, typical operations are performed in a state where load equivalent to the load in the load information associated with the existing-user-2 information 172A-2 is applied, and performances are measured.

In step S606, reports (a performance comparison result report and a recommendation report) are presented. Specifically, a performance comparison report 800 is generated and displayed. Compared with the execution environment generated on the basis of the use conditions desired by the new user 162, favorable execution environments (a "high-performance configuration" and a "low-charge configuration" that are recommended configurations) are selected. With respect to the generated execution environment, environments are each automatically built by raising or lowering the level of one of the parameter values. Specifically, a configuration having the highest performance among configurations obtained by raising the performance in the desired configuration (for example, by raising the level of one of the parameter values) may be selected as the "high-performance configuration". As the "low-charge configuration", a configuration having performance deterioration falling within a predetermined range (for example, deterioration by 10% or lower) and the lowest charge among configurations obtained by lowering the performance in the desired configuration (for example, by lowering the level of one of the parameter values) may be selected.

For example, a configuration involving a charge lower than the desired charge presented by the new user 162 is selected as a verification environment by using options as described below, and this configuration is referred to as a "desired configuration". The options are:

an instance type (such as a CPU performance or a memory I/O performance);

a disk type (such as an I/O performance); and a network type (such as a data upload/download performance).

In contrast to the desired configuration, a configuration recommended by the selection system is referred to as a "recommended configuration". The following two methods are used for selecting the recommended configuration.

(A) Existing-User-Using Configuration

In the information processing apparatus 100, users who use a target application under use conditions similar to the designated use conditions are extracted from existing users to reproduce load, and load information is thus acquired. A configuration most frequently used by the existing users under the same use conditions is determined as the recommended configuration. Alternatively, the lowest charge configuration, the highest charge configuration, or the like in the configurations used by the existing users under the same use conditions may be used as the recommended configuration.

(B) Relative Configuration

Figure 7:
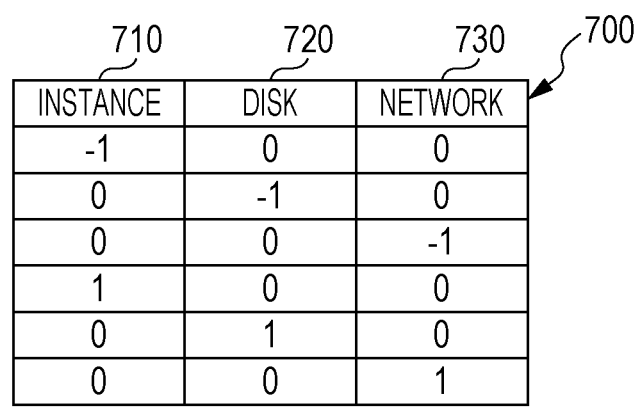
FIG. 7 is an explanatory table illustrating an example data structure of a parameter table.

In addition to the desired configuration designated by the new user 162, environments are built in combination patterns obtained by raising or lowering, by one level, the level of each type option one by one with respect to the desired configuration as in a parameter table 700 illustrated in the example in FIG. 7, and performances are measured. A configuration not having a high impact despite lowering of the level of the type option and a configuration exerting a high effect after raising the level of the type option are thereby determined, and a low-charge configuration and a high-performance configuration are used as the recommended configuration.

For example, "−1" indicating lowering and "+1" indicating raising are set as variations in the execution environment (such as in the instance, the disk, or the network) built on the basis of the use conditions. Specifically, the parameter table 700 is generated. FIG. 7 is an explanatory table illustrating an example data structure of the parameter table 700. The parameter table 700 has an instance column 710, a disk column 720, and a network column 730. The instance column 710 stores therein the level of an instance. The disk column 720 stores therein the level of a disk. The network column 730 stores therein the level of a network. The value "0" indicates the desired configuration. The first row for the instance, the second row for the disk, and the third row for the network each indicate a configuration having a "−1" level lowered in the lowering direction. The fourth row for the instance, the fifth row for the disk, and the sixth row for the network each indicate a configuration having a "+1" level raised in the raising direction. Note that values are predetermined for units of "−1" and "+1" for each of the instance, the disk, and the network.

In each environment thus automatically generated, load software is deployed also automatically, and performances are measured. A configuration exhibiting the highest performance, a configuration exhibiting relatively low deterioration in the performance (for example, by 10% or lower) and the lowest charge, and other configurations are extracted as the recommended configurations, and a report is output. Specifically, a recommended configuration based on verification may be presented with the characteristics of a cloud service being utilized, the characteristics allowing an execution environment to be changed easily.

FIG. 8 is an explanatory diagram illustrating an example of the performance comparison report 800. The performance comparison report 800 has a desired-configuration report area 810, a recommended-configuration (high performance) area 820, and a recommended-configuration (low charge) area 830. The desired-configuration report area 810 indicates, for example, "Desired configuration: 50000 yen desired monthly charge" including 45000 yen monthly charge for service A, 38000 yen monthly charge for service B, 100-second document download for service A, 120-second document download for service B, 200-second document registration for service A, 220-second document registration for service B, 5-second document browsing for service A, and 3-second document browsing for service B.

The recommended-configuration (high performance) area 820 indicates, for example, "Recommended configuration (high performance)" including 52000 yen monthly charge for service A, 55000 yen monthly charge for service B, 80-second document download for service A, 70-second document download for service B, 90-second document registration for service A, 120-second document registration for service B, 4-second document browsing for service A, and 3-second document browsing for service B.

The recommended-configuration (low charge) area 830 indicates, for example, "Recommended configuration (low charge)" including 38000 yen monthly charge for service A, 32000 yen monthly charge for service B, 110-second document download for service A, 130-second document download for service B, 220-second document registration for service A, 230-second document registration for service B, 5-second document browsing for service A, and 4-second document browsing for service B.

In step S608, a subjective-performance comparison operation is performed. Specifically, the information processing apparatus 100 causes the user terminal 160 to display a subjective-performance comparison operation screen 900 and a subjective-performance comparison operation screen 1000 and thus receives an instruction for experiencing performances in the cloud services 170.

FIG. 9 is an explanatory diagram illustrating an example display of the subjective-performance comparison operation screen 900. A target-service selection area 910, a target-operation selection area 920, a Next button 930, and a Cancel button 940 are displayed on the subjective-performance comparison operation screen 900.

One or more cloud services 170 to be executed are selectable in the target-service selection area 910.

For example, an operation to be performed (such as the "document download" operation, the "document registration" operation, or the "document browsing" operation) in the corresponding application in the one or more cloud services 170 is selectable in the target-operation selection area 920.

If the Next button 930 is selected, the subjective-performance comparison operation screen 1000 for experiencing a response to the selected operation is generated in accordance with the designation performed in the target-service selection area 910 and the target-operation selection area 920 and is displayed on the user terminal 160.

Figure 10:
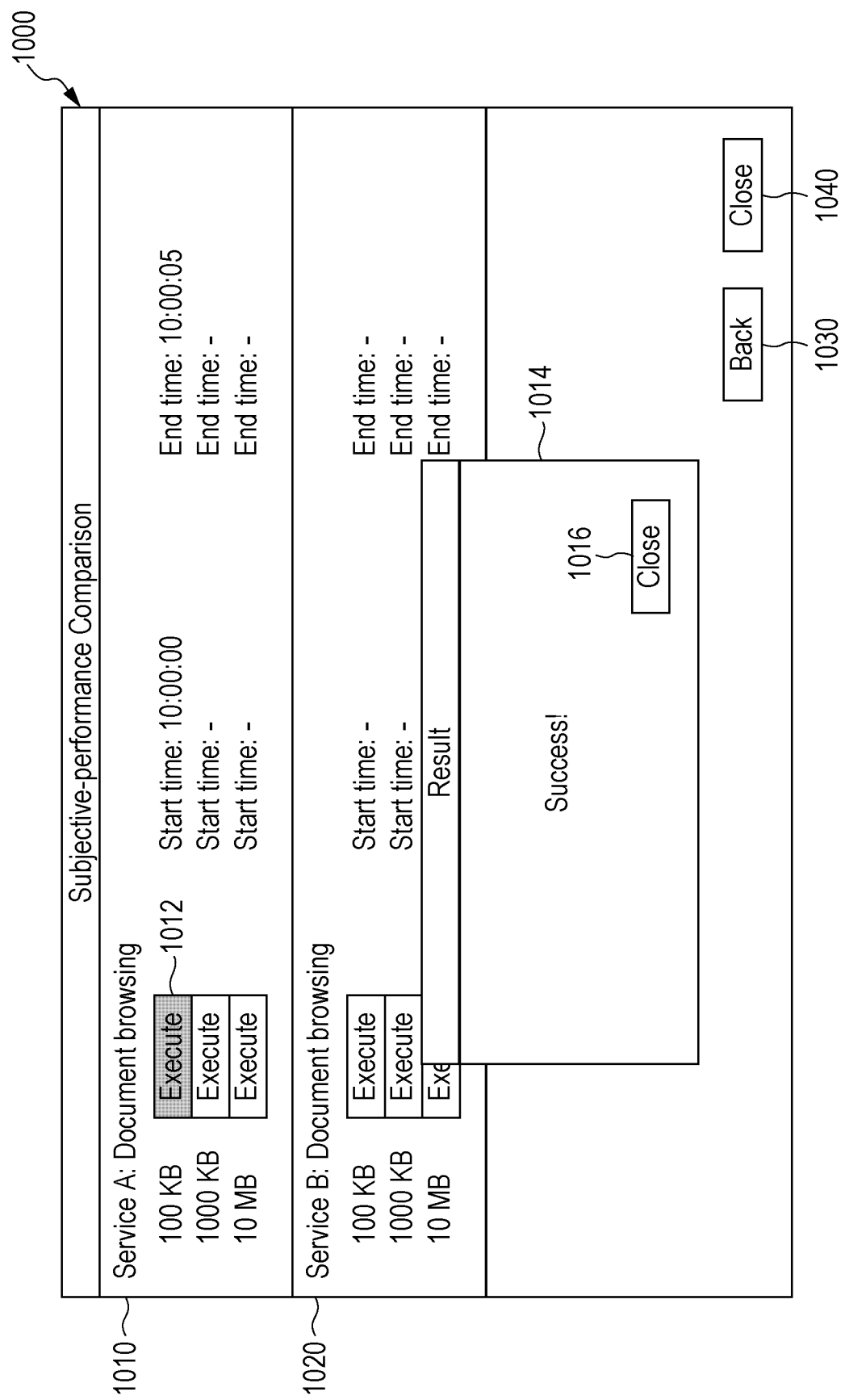
FIG. 10 is an explanatory diagram illustrating an example display of the subjective-performance comparison operation screen.

FIG. 10 is an explanatory diagram illustrating an example display of the subjective-performance comparison operation screen 1000. A service-A document browsing area 1010, a service-B document browsing area 1020, a Back button 1030, and a Close button 1040 are displayed on the subjective-performance comparison operation screen 1000. Functions of calling load software that enables reproduction of a load applied when a typical operation in a target application is performed alone are respectively assigned to buttons.

For example, if one of Execute buttons 1012 is selected, a process for applying "100 KB" load to "Service A: document browsing" is executed, and an execution result "Success" or "Failure" is displayed in an execution result area 1014. Time "10:00:00" at which execution of the application for "Service A: document browsing" is started and time "10:00:05" at which the execution ends are also displayed. Load to be applied alone and equivalent to load caused by the typical operation is thereby applied to an environment in which performances are measured (environment in which a load state during working hours in the existing-user-2 information 172A-2 is reproduced), and the new user 162 may thus verify a response time.

Note that a load state generally varies during working hours (for example, load is high at the start of working). The information processing apparatus 100 may be configured such that the user selects one of time ranges such as a work start time period (a predetermined period of time from the start of working), the morning, a lunch break, the afternoon, and after the working hours.

Figure 17:
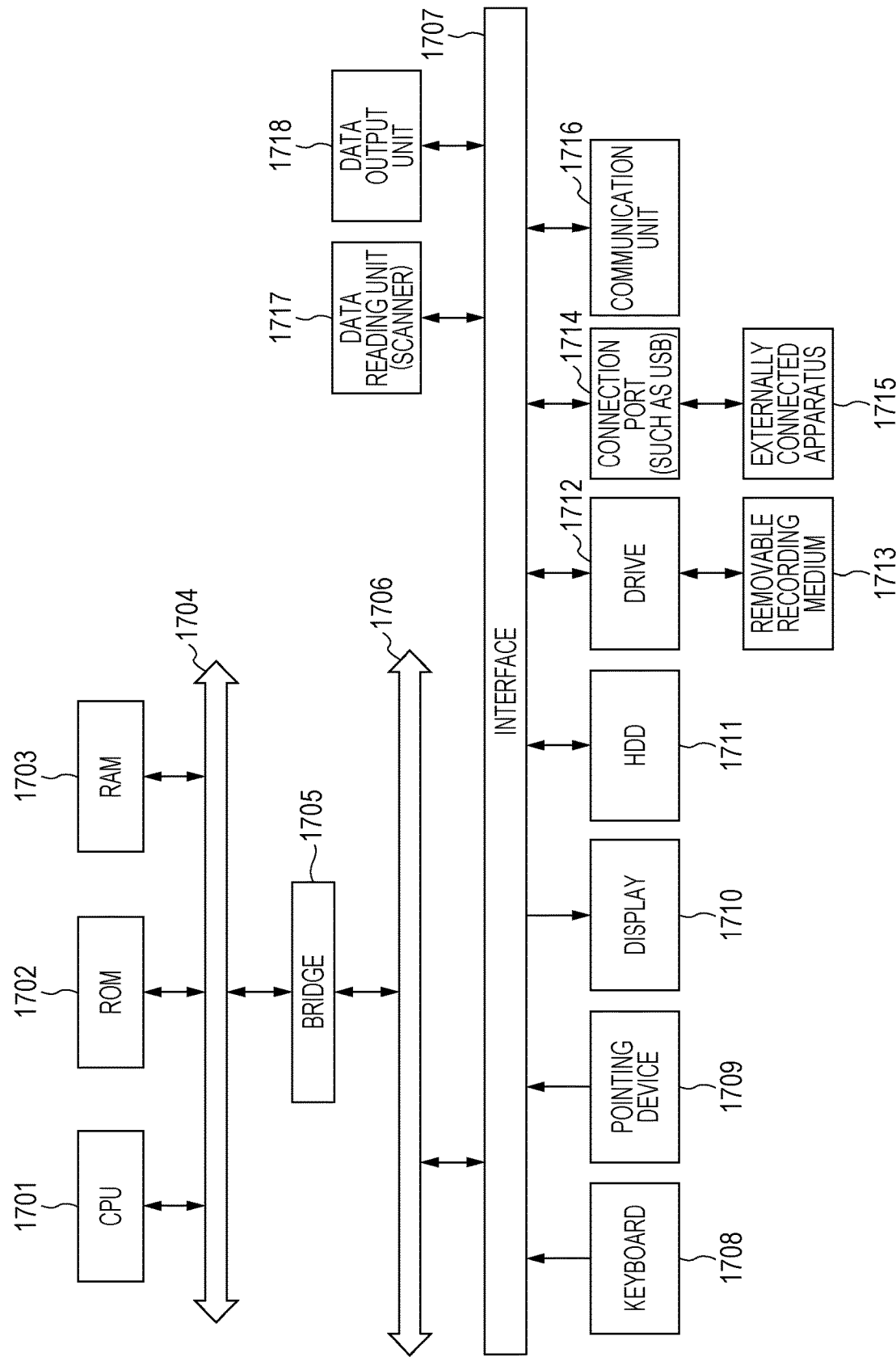
FIG. 17 is a block diagram illustrating an example hardware configuration of a computer that implements the exemplary embodiment.

An example hardware configuration of the information processing apparatus according to the exemplary embodiment will be described with reference to FIG. 17. The configuration illustrated in FIG. 17 is implemented by, for example, a personal computer (PC) and is an example hardware configuration including a data reading unit 1717 such as a scanner and a data output unit 1718 such as a printer.

A CPU 1701 is a controller that executes a process in accordance with a computer program describing a sequence of executing the various modules described above for the exemplary embodiment, that is, the modules such as the load-information/use-state collection module 105, the similar-use-user extraction module 120, the load-reproduction-parameter calculation module 125, the load-software deployment module 135, the subjective-performance-comparison-operation screen generation module 145, and the report generation module 150.

A read-only memory (ROM) 1702 is used to store a program used by the CPU 1701, operational parameters, and the like. A RAM 1703 is used to store the program used when the CPU 1701 is run, parameters appropriately varying when the CPU 1701 is run, and the like. These components are mutually connected by a host bus 1704 including a CPU bus and other components.

The host bus 1704 is connected to an external bus 1706 such as a peripheral component interconnect/interface (PCI) bus with a bridge 1705 placed therebetween.

A keyboard 1708 and a pointing device 1709 such as a mouse are devices operated by an operator. A display 1710 has a liquid crystal display device, a cathode ray tube (CRT), or the like and displays various pieces of information as text information and image information. The display 1710 may be a touch screen or the like having both the functions of the pointing device 1709 and the display 1710.

A hard disk drive (HDD) 1711 has a hard disk (may be a flash memory or the like) incorporated therein, drives the hard disk, and records and reproduces the program run by the CPU 1701 and information. The hard disk implements the functions of the use-state-information storage module 110, the load-information storage module 115, the service-information storage module 130, and other modules. Further, the hard disk is used to store various pieces of other data, various computer programs, and the like.

A drive 1712 reads out data or a program recorded in a removable recording medium 1713 such as a magnetic disk, an optical disk, a magneto-optical disk, or a semiconductor memory that is attached to the drive 1712 and supplies the data or the program to the RAM 1703 connected to the drive 1712 with an interface 1707, the external bus 1706, the bridge 1705, and the host bus 1704 located therebetween. The removable recording medium 1713 is also usable as a data recording area like the hard disk.

A connection port 1714 is a port for connection with an externally connected apparatus 1715 and has a USB- or IEEE1394-compliant connection unit. The connection port 1714 is connected to the CPU 1701 and the like with the interface 1707, the external bus 1706, the bridge 1705, the host bus 1704, and the like located therebetween. A communication unit 1716 is connected to a communication network and executes processes of data communication with external devices. The data reading unit 1717 is, for example, a scanner and executes processes of reading documents. The data output unit 1718 is, for example, a printer and executes processes of outputting document data.

The hardware configuration of the information processing apparatus in FIG. 17 merely illustrates a configuration example, and the exemplary embodiment is not limited to the configuration in FIG. 17. Any configuration that enables the modules described in the exemplary embodiment to be run may be employed. For example, at least one of the modules may be configured to run on hardware dedicated to the module (such as an application specific integrated circuit (ASIC)). At least one of the modules may be in an external system and be connected through a communication network. Further, multiple systems each serving as the system in FIG. 17 may be mutually connected through a communication network to work in cooperation with each other. In particular, the configuration may be incorporated in a mobile telecommunication device (including a mobile phone, a smartphone, a mobile device, a wearable computer, and other devices), a personal digital electronics, a robot, a copier, a fax machine, a scanner, a printer, a multifunction printer (an information processing apparatus having two or more functions of a scanner, a printer, a copier, a fax machine, and other devices), or the like, aside from a personal computer.

Note that the program described above may be provided by using a recording medium having the program recorded therein and may be provided by using a communication unit. In this case, for example, the program described above may be regarded as an exemplary embodiment of the invention of a "non-transitory computer readable medium having a program recorded therein".

The "non-transitory computer readable medium having a program recorded therein" refers to a computer readable recording medium having a program recorded therein that is used for installation, execution, distribution, and the like of a program.

Examples of the recording medium include: a digital versatile disk (DVD) supporting "DVD-R, DVD-RW, DVD-RAM, and the like" that are standards designated by the DVD Forum and "DVD+R, DVD+RW, and the like" that are standards designated in accordance with "DVD+RW; a compact disc (CD) such as a CD-ROM, a CD recordable (CD-R), a CD rewritable (CD-RW), or the like; a Blu-ray (registered trademark) disc; a magneto-optical disk (MO); a flexible disk (FD); a magnetic tape; a hard disk; a ROM; an electrically erasable and programmable ROM (EEPROM (registered trademark)); a flash memory; a RAM; and a secure digital (SD) memory card.

Part or the entirety of the aforementioned program may also be saved on the recording medium to be stored or distributed. The program or part thereof may be transmitted through communication by using a transmission medium such as a wired network used for a local area network (LAN), a metropolitan area network (MAN), a wide area network (WAN), the Internet, an intranet, an extranet, or the like; a wireless communication network; or a combination of these. Alternatively, the program or part thereof may be transmitted by using carrier signals.

Further, the program may be part or the entirety of another program, or may be saved on a recording medium together with a different program. The program may also be divided to be saved on multiple recording media. The program may be saved in any manner such as by being compressed or encrypted, as long as the program is restorable.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor and associated memory configured to:
        search available cloud services for a cloud service including a second application that has been used under a use condition similar to a use condition for a first application that is a target application to be used by a user;
        extract, from the available cloud services and in accordance with similarity in the use conditions for the first and second applications, the cloud service including the second application;
        acquire load information regarding a result of prior use of the second application in the extracted cloud service;
        generate from the acquired load information a parameter for satisfying the use condition for the first application in the extracted cloud service;
        build, in each of a plurality of the available cloud services, a first environment for implementing the first application by using the parameter and a second environment for implementing the first application by using another parameter obtained by raising or lowering a value of the parameter; and
    a presentation unit that presents, to the user, a result of measurement of a performance of the first application in each of the environments built in the plurality of the available cloud services, the measurement being performed by applying to the environment a load equivalent to the load in the load information associated with the second application.

2. The information processing apparatus according to claim 1,
    wherein the processor generates a plurality of parameters, including the other parameter, for satisfying the use condition for the first application by raising or lowering a value of the parameter, and
    wherein the presentation unit presents, to the user, results of measurement performed by using the plurality of parameters.

3. The information processing apparatus according to claim 2,
    wherein the presentation unit presents results of measurement performed using a configuration based on the use condition and a configuration exhibiting a high performance or a configuration leading to a low charge.

4. The information processing apparatus according to claim 1,
    wherein the processor executes the first application in at least one of the environments to enable the user to experience the performance of the first application.

5. The information processing apparatus according to claim 4,
    wherein the processor provides load that is selectable in accordance with an operation performed by the user.

6. A non-transitory computer readable medium storing a program causing a computer to execute a process for information processing, the process comprising:
    searching available cloud services for a cloud service including a second application that has been used under a use condition similar to a use condition for a first application that is a target application to be used by a user;

extracting, from the available cloud services and in accordance with similarity in the use conditions for the first and second applications, the cloud service including the second application;

acquiring load information regarding a result of prior use of the second application in the extracted cloud service;

generating from the acquired load information a parameter for satisfying the use condition for the first application in the extracted cloud service;

building, in each of a plurality of the available cloud services, a first environment for implementing the first application by using the parameter and a second environment for implementing the first application by using another parameter obtained by raising or lowering a value of the parameter; and presenting, to the user, a result of measurement of a performance of the first application in each of the environments built in the plurality of the available cloud services, the measurement being performed by applying to the environment a load equivalent to the load in the load information associated with the second application.

* * * * *